United States Patent [19]
Seki et al.

[11] Patent Number: 5,712,028
[45] Date of Patent: Jan. 27, 1998

[54] MAGNETIC RECORDING MEDIUM

[75] Inventors: Akihiko Seki; Akira Saitoh; Satoru Tsuchida, all of Saku, Japan

[73] Assignee: TDK Corporation, Tokyo, Japan

[21] Appl. No.: 618,260

[22] Filed: Mar. 18, 1996

[30] Foreign Application Priority Data

Mar. 23, 1995 [JP] Japan ................. 7-090297

[51] Int. Cl.$^6$ ................. G11B 05/70
[52] U.S. Cl. ................. 428/216; 428/323; 428/336; 428/694 BS; 428/900
[58] Field of Search ................. 428/216, 323, 428/336, 694 BS, 900

[56] References Cited

U.S. PATENT DOCUMENTS

| | | | |
|---|---|---|---|
| 5,405,679 | 4/1995 | Isobe | 428/212 |
| 5,455,093 | 10/1995 | Kawamata et al. | 428/65.3 |

FOREIGN PATENT DOCUMENTS 0 623 918  11/1994  European Pat. Off.

OTHER PUBLICATIONS

Patent Abstracts of Japan, 60-171631, Sep. 5, 1985, English Abstract.
Patent Abstracts of Japan, 62-222247, Sep. 30, 1987, English Abstract.
Patent Abstracts of Japan, 63-193325, Aug. 10, 1988, English Abstract.
Patent Abstracts of Japan, 3-102633, Apr. 30, 1991, English Abstract.
Patent Abstracts of Japan, 5-197946, Aug. 6, 1993, English Abstract.

*Primary Examiner*—Stevan A. Resan
*Attorney, Agent, or Firm*—Oblon, Spivak, McClelland, Maier & Neustadt, P.C.

[57] ABSTRACT

A magnetic recording medium includes a flexible substrate, an undercoating layer formed on the substrate, and a magnetic layer formed on the undercoating layer. The undercoating layer contains a binder and nonmagnetic particles having an average particle size in the range of 0.01 to 0.20 μm. The content of the nonmagnetic particles in the undercoating layer is in the range of 40 to 85% by weight. The magnetic layer contains ferromagnetic powder, a binder and an abrasive having an average particle size in the range of 0.10 to 0.40 μm. The magnetic layer has a thickness in the range of 0.10 to 0.30 μm and contains the abrasive in the range of 1 to 5 parts by weight relative to 100 parts by weight of the ferromagnetic powder. With this arrangement, the magnetic recording medium is capable of high density recording and excellent in electromagnetic transducer property and durability.

5 Claims, 1 Drawing Sheet

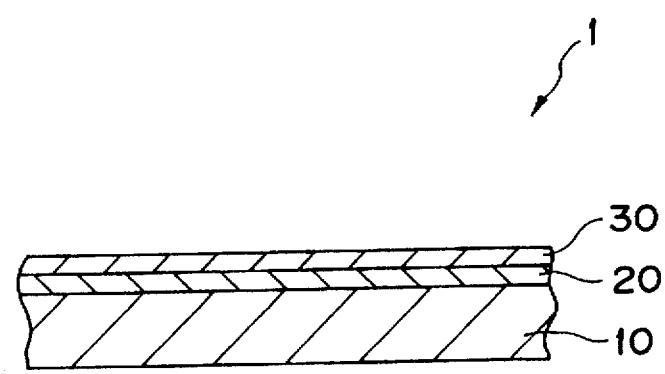
F I G . 1

MAGNETIC RECORDING MEDIUM

BACKGROUND OF THE INVENTION

The present invention relates to a magnetic recording medium, and particularly to a coating-type magnetic recording medium which is suitable for the high density recording.

In a magnetic layer of the magnetic recording medium, an addition of abrasives (fillers) is essential for preventing chipping or shaving of a surface of the magnetic layer due to a magnetic head which comes in contact therewith on recording and replaying.

When determining a particle size and an adding amount of the abrasive, it is necessary to consider durability and electromagnetic transducer property of the magnetic layer, while consideration is also required for preventing tile magnetic layer from shaving the magnetic head during recording and replaying.

On the other hand, it has been strongly required that a thickness of the magnetic layer of the digital medium be reduced largely in view of the demand for the high density recording.

However, if the conventional abrasives (fillers) which has conventional grain size is used as it is for achieving reduction in thickness of the magnetic layer, directly formed on the substrate without undercoating layer, a required electromagnetic transducer property may not be achieved due to insufficient smoothness of the surface of the magnetic layer.

On the other hand, if the very fine abrasives (fillers), having suitable size for the reduced thickness of the magnetic layer, is used as it is for achieving sufficient smoothness of the surface of the magnetic layer, a required running property and durability of the magnetic recording medium may not be achieved due to the grain size of the abrasives (fillers).

For coping with such problems, Japanese First (unexamined) Patent Publication No. 62-222427 has proposed a magnetic recording medium, wherein an undercoating layer containing abrasives having an average particle size of 0.5–3 µm is provided under a magnetic layer having a thickness of 1 µm and less, and portions of the abrasive are projected on a side of the magnetic layer.

On the other hand, Japanese First (unexamined) Patent Publication No. 5-197946 has proposed a magnetic recording medium, wherein a nonmagnetic coating liquid is applied onto a nonmagnetic substrate, and a magnetic coating liquid is applied thereon while a layer of the applied nonmagnetic coating liquid is still in a wet state, so as to form a magnetic layer having a thickness of 1 µm and less. The magnetic layer contains therein an abrasive particles of which have a hardness of Moh's hardness 6 or more and are greater than the thickness of the magnetic layer.

However, since the medium in the former publication has the structure where the large particles of the abrasive in the undercoating layer project on the side of the magnetic layer, the surface roughness of the undercoating layer appears on the magnetic layer as it is so as to deteriorate the electromagnetic transducer property thereof for shorter wavelength.

Further, since the medium in the latter publication has the structure where the magnetic layer is formed while the layer of the applied nonmagnetic coating liquid is still in the wet state, portions of the abrasive contained in the magnetic layer get in the nonmagnetic layer provided under the magnetic layer so that the effect expected by the addition of the abrasive is largely reduced.

SUMMARY OF THE INVENTION

It is an object of the present invention to provide a magnetic recording medium which is capable of high density recording and excellent in electromagnetic transducer property and durability, by setting the optimum specifications of a magnetic layer and an undercoating layer provided under the magnetic layer. The present inventors have found out that the high density recording and the excellent electromagnetic transducer property and durability can only be achieved by means of a combination of the magnetic layer and the undercoating layer having given preset specifications.

According to one aspect of the present invention, a magnetic recording medium comprises a flexible substrate; an undercoating layer formed on the substrate; and a magnetic layer formed on the undercoating layer, wherein the undercoating layer contains a binder and nonmagnetic particles having an average particle size in the range of 0.01 to 0.20 µm, the undercoating layer containing therein the nonmagnetic particles in the range of 40 to 85% by weight, and wherein the magnetic layer contains ferromagnetic powder, a binder and abrasives having an average particle size in the range of 0.10 to 0.40 µm, the magnetic layer having a thickness in the range of 0.10 to 0.30 µm and containing the abrasive in the range of to 5 parts by weight relative to 100 parts by weight of the ferromagnetic powder.

It may be arranged that a thickness of the undercoating layer is in the range of 0.5 to 2.0 µm.

It may be arranged that the magnetic layer is applied on the undercoating layer which is applied on the substrate and dried.

It may be arranged that the undercoating layer is applied on the flexible substrate, dried and then subjected to a calendering treatment.

It may be arranged that the undercoating layer is applied on the flexible substrate, dried and then subjected to a hardening treatment.

It may be arranged that the undercoating layer is applied on the flexible substrate, dried, then subjected to a calendering treatment and further subjected to a hardening treatment.

According to one aspect of the present invention, the magnetic recording medium includes an undercoating layer, which contains a given amount of the nonmagnetic particles having a given average particle size, on the flexible substrate, and further includes the magnetic layer, which contains a given amount of the abrasive having a given average particle size, on the undercoating layer. Thus, the magnetic layer can achieve excellent surface smoothness, and the abrasive contained in the magnetic layer effectively works. As a result, high density recording can be achieved, and electromagnetic transducer property and durability can be highly improved.

According to another aspect of the present invention, the magnetic layer is applied after the undercoating layer is dried. Thus, mixing at a surface between the magnetic layer and the undercoating layer can be prevented and the uniform magnetic layer can be achieved.

BRIEF DESCRIPTION OF THE DRAWINGS

FIG. 1 is a sectional view showing a magnetic recording medium according to a preferred embodiment of the present invention.

DESCRIPTION OF THE PREFERRED EMBODIMENT

Now, a preferred embodiment of the present invention will be described hereinbelow with reference to FIG. 1.

FIG. 1 is a sectional view showing a magnetic recording medium 1 according to the preferred embodiment of the present invention. As shown in the figure, the magnetic recording medium 1 includes a flexible substrate 10, an undercoating layer 20 formed on the flexible substrate 10, and a magnetic layer 30 formed on the undercoating layer 20.

The flexible substrate 10 may be any of the well-known plastic films such as, for example, polyesters like polyethylene terephthalate and polyethylene-2, 6-naphthalate, polyamides, polyimides.

No particular limitation is available to a thickness of the substrate 10. On the other hand, for satisfying the demand for reduction in size of the magnetic recording medium, the thickness of the substrate 10 may be set in the range of 2 to 14 μm, and preferably 3 to 10 μm.

The undercoating layer 20 formed on the substrate 10 contains a binder and nonmagnetic particles. The nonmagnetic particles contained in the undercoating layer 20 have an average particle size in the range of 0.01 to 0.20 μm, preferably 0.02 to 0.18 μm, and more preferably 0.03 to 0.15 μm. If this value is over 0.20 μm, the surface roughness of the undercoating layer is deteriorated. On the other hand, if this value becomes under 0.01 μm, a dispersion property of the nonmagnetic particles in the coating material is deteriorated so that the surface roughness is not improved despite reduction in particle size. The nonmagnetic particles may be in the shape of either granules or needles. The average particle size of the nonmagnetic particles is defined in this preferred embodiment. Specifically, the average particle size is determined by measuring the maximum length of each of the particles and then deriving the arithmetic mean of the measured maximum lengths. As a specific measuring method, the magnetic recording medium is covered by the thermosetting epoxy resin and then cut into thin pieces by a diamond cutter to obtain samples. The samples are observed by a transmission electron microscope (TEM) (produced by Nippon Electronics K.K. and marketed under product code of "JEM100CX"), increasing observing portions depending on necessity to measure 100 particles or more in total, so that the average particle size is derived as a mean value thereof.

The nonmagnetic particles are contained in the undercoating layer 20 in the range of 40 to 85% by weight, preferably 50 to 83% by weight, and more preferably 60 to 80% by weight. If this value is over 85% by weight, a dispersion property of the nonmagnetic particles may be deteriorated or the applied layer containing the nonmagnetic particles may become friable due to an insufficient amount of resin. On the other hand, if this value becomes under 40% by weight, the abrasive in the magnetic layer is liable to get in the undercoating layer, or the stress concentration to the magnetic layer is not achieved during a surface treatment (calendering treatment) so that the surface roughness of the magnetic layer is not improved.

As concrete examples of the nonmagnetic particles, aluminas like α-alumina, β-alumina, γ-alumina, θ-alumina, δ-alumina, cerium oxide, carbon black, dichromium trioxide, α-iron oxide, γ-iron oxide, goethite, $SiO_2$, ZnO, titanium carbite, $TiO_2$, $ZrO_2$, $SnO_2$, silicon nitride, boron nitride, silicon carbide, titanium carbide, molybdenum carbide, boron carbide, tungsten carbide, calcium carbonate, barium carbonate, strontium carbonate, magnesium carbonate, barium sulfate, zinc sulfide, molybdenum disulfide, tungsten disulfide, and man-made diamond, for example, may be cited. These compounds are used singly or in combination. Of these, it is preferable to use α-iron oxide, titanium oxide, carbon black and aluminas. Carbon black may be used in combination with one or more of the foregoing compounds (excluding carbon black) or with one or more of a plurality of carbon blacks.

Further, the undercoating layer 20 contains a binder (resin binder). The binder may be selected from among later-described binders of the magnetic layer so that explanation thereof is omitted herein.

The undercoating layer 20 is formed by applying a coating material on the flexible substrate 10 and then drying it. Specifically, a coating material containing the foregoing nonmagnetic particles and the foregoing binder as well as a lubricant and a solvent which lubricant and solvent are normally added, is applied onto the substrate 10 and then dried so that the undercoating layer 20 is formed. Thereafter, the magnetic layer 30 is formed thereon. By using the so-called wet-on-dry method in which the magnetic layer 30 is applied after the undercoating layer 20 is dried, a later-described abrasive in the magnetic layer 30 is prevented from getting in the undercoating layer 20 so that the durability of the magnetic layer is ensured according to the initial setting.

Further, it is preferable to perform a so-called calendering treatment after drying of the undercoating layer 20 and before the formation of the magnetic layer for smoothing the undercoating layer 20. By performing the calendering treatment, the surface roughness of the undercoating layer 20 is improved, and thus, the surface roughness of the magnetic layer 30 coated on the undercoating layer 20 is also improved. Further, burying of the abrasive into the undercoating layer 20 is effectively suppressed. As a result, the electromagnetic transducer property is significantly improved.

The calendering treatment may be performed in the so-called coating line of the undercoating layer 20 or after winding the laminate coated with the undercoating layer 20. Although it depends on a material of the substrate 10, the calendering treatment is normally performed under the conditions of a temperature in the range of 80° to 130° C., preferably 90° to 120° C., and a linear pressure in the range of 100 to 500 kg/cm, preferably 200 to 400 kg/cm. As occasion demands, the undercoating layer 20 may be subjected to a hardening treatment after drying. As the hardening treatment, a thermosetting treatment, an electron beam hardening, an ultraviolet hardening and the like may be cited. Considering facilitation of the processing, it is preferable to perform the calendering treatment before the hardening treatment of the undercoating layer 20.

A thickness of the undercoating layer 20 is set in the range of 0.5 to 2.0 μm, and preferably in the range of 1.0 to 1.5 μm. If this value is over 2.0 μm, curling or cupping of the applied layer is enlarged so that envelope failure is liable to occur. On the other hand, if this value becomes under 0.5 μm, the surface roughness depends on that of the substrate 10 and thus the surface roughness of the magnetic layer 30 can not be improved.

Further, the undercoating layer 20 normally contains a lubricant like fatty acid, fatty acid ester or the like. Thus, the lubricant is fed from the undercoating layer 20 to the magnetic layer 30 in sequence so as to improve the durability of the magnetic recording medium.

The magnetic layer 30 is formed on the undercoating layer 20. It has a thickness in the range of 0.10 to 0.30 μm, preferably 0.10 to 0.20 μm, and more preferably 0.10 to 0.15 μm. The thickness of the magnetic layer is set, when assuming the high density digital medium, in consideration of electromagnetic property at high frequencies (shorter wavelength) required to the medium. Specifically, the foregoing thickness range is determined in view of recording wavelength, overwrite property, suppression of self-demagnetization of the magnetic layer and the like.

The magnetic layer 30 contains, as main components, ferromagnetic powder, a binder (resin binder) and abrasives. An average particle size of the abrasive is set in the range of 0.10 to 0.40 µm, preferably 0.10 to 0.30 µm, and more preferably 0.10 to 0.20 µm. If this value is over 0.40 µm, the abrasion of the magnetic head which comes in contact with the magnetic recording medium is extremely increased. On the other hand, if this value becomes under 0.10 µm, no projecting height of the abrasive is available in the applied layer so that the durability is deteriorated. In this preferred embodiment, the average particle size of the abrasive is defined as follows. Specifically, the average particle size is determined by measuring the maximum length of each of the particles and then deriving the arithmetic mean of the measured maximum lengths. As a specific measuring method, photographs of sections of the magnetic recording medium are taken, and then, 100 abrasive particles and over are sampled from those in the photographs. Thereafter, the maximum length of each of the sampled particles is measured so that the average particle size is derived as a mean value thereof.

The abrasive is contained, relative to 100 parts by weight of the ferromagnetic powder, in the range of 1 to 5 parts by weight, preferably 1 to 4 parts by weight, and more preferably 1 to 3 parts by weight. If this value is over 5 parts by weight, the abrasion of the magnetic head which comes in contact with the magnetic recording medium is extremely increased, or the electromagnetic transducer property is deteriorated. On the other hand, if this value becomes under 1 part by weight, the durability of the applied layer, that is, the magnetic layer 30, is deteriorated.

As concrete examples of the abrasive, inorganic powder, such as metals, metal oxides, metal carbonates, metal sulfates, metal nitrides, metal carbides and metal sulfides may be cited.

More specifically, α-alumina, β-alumina, γ-alumina, θ-alumina, δ-alumina, dichromium trioxide, α-iron oxide, $SiO_2$, ZnO, $TiO_2$, $ZrO_2$, $SnO_2$, silicon nitride, boron nitride, silicon carbide, titanium carbide, molybdenum carbide, boron carbide, tungsten carbide, calcium carbonate, barium carbonate, strontium carbonate, magnesium carbonate, barium sulfate, zinc sulfide, molybdenum disulfide, tungsten disulfide, and man-made diamond, for example, may be used singly or in combination.

The foregoing abrasive is not always required to have an assay of 100%. If the main component is 70% or more, the effect is not reduced.

It is further necessary that the abrasive contains water-soluble ions of alkali metals, alkaline earth metals, chlorine, sulfuric acid, and nitric acid only in a minute amount. If these ions are contained therein in an unduly large amount, the excess ions will exert adverse effects on the storage properties of the produced magnetic recording medium.

The magnetic layer 30 contains the ferromagnetic powder. As concrete examples of the ferromagnetic powder to be used for the magnetic coating material, magnetic iron oxide powder, ferromagnetic metal powder, platelet hexagonal ferrite, and chromium dioxide may be cited. Of these, it is preferable to use the ferromagnetic metal powder and the platelet hexagonal ferrite. The ferromagnetic powder normally has a coercive force Hc=1,800–2,500 Oe, a saturation magnetization σs=120–150 emu/g, a specific surface area as determined by the BET (Brunauer-Emmett-Teller) method being in the range of 50 to 70 $m^2/g$, a length of major axis 0.05 to 0.20 µm, and a length of short axis being 20 nm and less.

As concrete examples of the ferromagnetic metal powder, Fe, Ni, Co, and alloys thereof may be cited. When those compounds which have as main components thereof such ferromagnetic metal elements as α-Fe, Fe—Co, Fe—Ni, Fe—Co—Ni, Co, and Co—Ni are used, they appropriately contain 70% and over, preferably 75% and over, by weight of a metal (Fe, Co, or Ni) or an alloy thereof. In the case of a magnetic powder of ferromagnetic metal which has Fe as a main component and further contains at least Co, normally the amount of the Co atom is appropriately in the range of 5 to 40%, preferably 6 to 35%, by weight based on the amount of the Fe atom. Advantageously, a ferromagnetic metal powder which has Fe and/or Co as a main component additionally contain rare earth elements including Y. Optionally, such a ferromagnetic metal powder as mentioned above may be particles having the surface thereof coated with an oxide layer, partially carbonized or nitrided particles, or particles having the surface thereof coated with a carbonaceous layer. This ferromagnetic metal powder may contain a small amount of a hydroxide or an oxide. The ferromagnetic metal powder to be used in this invention can be obtained by any of the well-known methods such as, for example, a method which comprises reducing an organic acid salt (mainly oxalic acid salt) of a ferromagnetic metal with such a reducing gas as hydrogen, a method which comprises reducing with such a reducing gas as hydrogen either hydrated iron oxide or iron oxide obtained by heating hydrated iron oxide, a method which comprises thermally decomposing a metal carbonyl compound, a method which comprises reducing the aqueous solution of a ferromagnetic alloy by the use of such a reducing agent as sodium boron hydride, a hypophosphite, or hydrazine, and a method which comprises vaporizing a metal in an inert gas kept at a lowered pressure thereby converting it into a fine powder. Optionally, the ferromagnetic metal powder thus obtained may be subjected, prior to use, to any of the well-known methods for gradual oxidation such as, for example, a method which comprises soaking the powder in an organic solvent and then drying the wet powder, a method which comprises soaking the powder in an organic solvent, blowing an oxygen-containing gas into the bath thereby coating the surface of particles of the powder with an oxide film, and then drying the wet powder, and a method which comprises forming an oxide layer on the surface of particles of the powder by adjusting the partial pressures of oxygen gas and an inert gas without using an organic solvent.

The platelet hexagonal ferrite is a ferromagnetic powder consisting of hexagonal plates whose axes of easy magnetization lie perpendicularly to the relevant plates. As concrete examples of the platelet hexagonal ferrite, Ba-ferrite, Sr-ferrite, Pb-ferrite, Ca-ferrite, ferrites substituted by a metallic atom possessing a valency equaling the total of valencies of relevant Fe atoms, and hexagonal Co powder may be cited. More specifically, magneto-plumbite type Ba-ferrite and Sr-ferrite and such magneto-plumbite type Ba-ferrite and Sr-ferrite as partially contain a spinel phase may be cited. Such ferrites as are substituted by a metallic atom possessing a valency equaling the total of valencies of relevant Fe atoms for the purpose of controlling the coercive force of Ba-ferrite or Sr-ferrite prove particularly advantageous. The metallic atoms appropriately usable for the substitution which is aimed at controlling the coercive force include Co—Ti, Co—Ti—Sn, Co—Ti—Zr, Cu—Zn, Cu—Ti—Zn, Ni—Ti—Zn, etc., for example. When the Ba-ferrite is used, the term "plate diameter" refers to the width of the individual hexagonal plate-like particles of the powder and it is measured with the aid of an electron microscope. The plate diameter is in the approximate range of 0.01 to 0.1 μm and the plate thickness is normally in the approximate range of ½ to 1/20 of the diameter.

All the ferromagnetic powders mentioned above are allowed to incorporate therein a small amount of any of such elements as Al, Si, Cr, Mn, Co, Ni, Zn, Cu, Zr, Ti, Bi, Ag, Pt, B, C, P, N, Y, S, Sc, V, Mo, Rh, Pd, Ag, Sn, Sb, Te, Ba, Ca, Ta, W, Re, Au, Hg, Pb, La, Sr, and rare earth elements. The incorporation of Al, Si, P, Y, or a rare earth element, among other elements cited above, brings about the effect of improving particle size distribution and preventing the phenomenon of sintering.

These ferromagnetic powders may be coated with a layer of Al, Si, P, or an oxide thereof or may be given a surface treatment with a coupling agent such as Si, Al, or Ti or with a varying surfactant.

Some, if not all, of the ferromagnetic metal powders contain such a water-soluble inorganic ion as Na, K, Ca, Fe, or Ni. The content of the inorganic ion is normally appropriately 500 ppm and less.

These ferromagnetic powders may be treated, prior to dispersion, with a dispersant, a lubricant, a surfactant, an antioxidant, etc. which will be more specifically described herein below.

The water content of the ferromagnetic powder is normally appropriately in the range of 0.1 to 2%. Preferably, it is optimized, depending on the kind of binding agent to be used.

The ferromagnetic powder advantageously has the pH value thereof optimized in the range of 4 to 12, preferably 6 to 10, by virtue of the combination thereof with the binder resin to be used.

The ferromagnetic powder generally is contained in an amount in the range of 100 to 2000 parts by weight, based on 100 parts by weight of the binder. The content of the ferromagnetic powder in the magnetic layer is in the range of 50 to 95% by weight, preferably 55 to 90% by weight, based on the total amount of the magnetic layer. If the content of the ferromagnetic powder is unduly large, the magnetic layer will tend to incur defects such as unduly low durability because the amount of resin and other additives in the magnetic layer is decreased proportionately. If this content is unduly small, the magnetic layer will be unable to produce a high play-back output.

The ferromagnetic powders enumerated above by way of example may be used either singly or in the form of a mixture of two or more members.

The binder resins which are appropriately used in the magnetic layer 30 and the undercoating layer 20 include thermoplastic resins, thermo-setting or reactive resins, and electron beam-sensitive modified resins, for example. These resins are selected and used as combined optionally to suit the properties of the medium and the conditions of process of manufacture.

The thermoplastic resin has a softening temperature of 150° C. and less, an average molecular weight in the approximate range of 5,000 to 200,000, and a polymerization degree in the approximate range of 50 to 2,000. The thermosetting resin, the reactive resin, or the electron beam-sensitive modified resin has the same average molecular weight and polymerization degree as the thermoplastic resin and, when heated and/or irradiated with an electron beam after the steps of coating, drying, and calendering, undergoes such a reaction as condensation or addition and acquires an infinite molecular weight.

Among other combinations of these resins, such combinations of vinyl chloride type copolymers with polyurethane resin are used particularly advantageously.

Vinyl chloride type copolymers appropriately have a vinyl chloride content in the range of 60 to 95%, preferably 60 to 90%, by weight and an average polymerization degree in the approximate range of 100 to 500.

The vinyl chloride type resins which answer the description include vinyl chloride-vinyl acetate-vinyl alcohol copolymer, vinyl chloride-hydroxyalkyl(meth)acrylate copolymer, vinyl chloride-vinyl acetate-maleic acid copolymer, vinyl chloride-vinyl acetate-vinyl alcohol-maleic acid copolymer, vinyl chloride-vinyl acetate-hydroxyalkyl(meth)acrylate copolymer, vinyl chloride-vinyl acetate-hydroxyalkyl(meth)acrylate-maleic acid copolymer, vinyl chloride-vinyl acetate-vinyl alcohol-glycidyl(meth)acrylate copolymer, vinyl chloride-hydroxyalkyl-(meth)acrylate-glycidyl(meth)acrylate copolymer, vinyl chloride-vinyl acetate-vinyl alcohol-glycidyl(meth)acrylate-allyl glycidyl ether copolymer, and vinyl chloride-vinyl acetate-vinyl alcohol-allyl glycidyl diether copolymer, for example. Among copolymers mentioned above, copolymers of vinyl chloride with such monomers as contain an epoxy(glycidyl) group prove particularly advantageous. Appropriately these vinyl chloride type copolymers contain a sulfuric acid group and/or a sulfo group as a polar group (hereinafter referred to as S-containing polar group). In the S-containing polar groups (—$SO_4Y$, —$SO_3Y$), Y may be H or an alkali metal. Particularly preferably, these groups are —$SO_4K$ and —$SO_3K$ which have K for Y. The vinyl chloride type copolymers under discussion may contain either or both of the S-containing polar groups. When both of them are contained, the ratio thereof may be arbitrary.

In the binder, S-containing polar groups are appropriately contained in an amount in the range of 0.01 to 10%, preferably 0.1 to 5%, by weight as S atoms in the molecule.

As polar groups, —$OPO_2Y$ group, —$PO_3Y$ group, —COOY group (wherein Y stands for H or an alkali metal), amino group (—$NR_2$), or —$NR_3Cl$ (wherein R stands for H, methyl, or ethyl) may be contained, as occasion demands, besides the S-containing polar group.

Among other groups mentioned above, the amino group need not be used in combination with the aforementioned S and may be in a varying kind. A dialkylamino group (preferably having an alkyl of one to ten carbon atoms) proves particularly appropriate.

The amino group of this nature is generally obtained by means of amine modification. Specifically, it is obtained by dispersing or dissolving a copolymer of vinyl chloride with an alkylcarboxylic vinyl ester in such an organic solvent as an alcohol, adding to the resultant dispersion or solution an amine compound (such as primary, secondary, or tertiary amine as aliphatic amine, alicyclic amine, alkanol amine, or alkoxyalkyl amine) and an epoxy group-containing compound intended to facilitate saponification, and subjecting the reactants to saponification. The amino group-containing vinyl unit is contained in an amount in the range of 0.05 to 5% by weight and it may ultimately contain an ammonium base.

The resin skeleton which is bound by the S-containing polar group is a vinyl chloride type resin. It can be obtained by polymerizing vinyl chloride, a monomer containing an epoxy group, or optionally other monomer copolymerizable therewith in the presence of such a radical generator as potassium persulfate or ammonium persulfate which possesses an S-containing strong acid radical. The amount of the radical generating agent to be used is generally in the range of 0.3 to 9.0%, preferably 1.0 to 5.0%, by weight based on the amount of the monomer. Since the present polymerization system is mostly soluble in water, the polymerization is appropriately carried out in the form of emulsion polymerization, suspension polymerization using such an alcohol as methanol as a polymerization medium, or solution polymerization using a ketone as a solvent.

In this case, a radical generating agent which is generally used in the polymerization of vinyl chloride can be used in addition to the radical generating agent possessing an S-containing strong acid radical.

It is also permissible to use the radical generating agent possessing an S-containing strong acid radical in combination with such a reducing agent as formaldehyde sodium sulfoxylate, sodium sulfite, or sodium thiosulfate.

As concrete examples of the epoxy group-containing monomer, glycidyl ethers of unsaturated alcohols such as (meth)allyl glycidyl ether, glycidyl esters of (meth)acrylic acid such as glycidyl (meth)acrylate, glycidyl esters of unsaturated acids such as glycidyl-p-vinyl benzoate, methylglycidyl itaconate, glycidylethyl maleate, glycidylvinyl sulfonate, and glycidyl (meth)allyl sulfonate, and epoxide olefins such as butadiene monoxide, vinylcyclohexene monoxide, and 2-methyl-5,6-epoxyhexene may be cited. Generally, this monomer is used in such an amount that the content of epoxy group in the copolymer is 0.5% and over by weight.

As concrete examples of the monomer which is optionally used in addition to vinyl chloride and an epoxy group-containing monomer, carboxylic vinyl esters such as vinyl acetate and vinyl propionate, vinyl ethers such as methylvinyl ether, isobutylvinyl ether, and cetylvinyl ether, vinylidenes such as vinylidene chloride and vinylidene fluoride, unsaturated carboxylic esters such as diethyl maleate, butylbenzyl maleate, di-2-hydroxyethyl maleate, dimethyl itaconate, methyl (meth)acrylate, ethyl (meth)acrylate, lauryl (meth)acrylate, and 2-hydroxypropyl (meth)acrylate, olefins such as ethylene and propylene, and unsaturated nitriles such as (meth)acrylonitrile may be cited.

The polyurethane resin which is used in combination with such a vinyl chloride type resin as mentioned above has the advantage of particularly excelling in wear resistance and adhesiveness to a substrate. It appropriately contains a polar group or a hydroxyl group in the side chain thereof. A polyurethane resin which possesses a polar group containing sulfur or phosphorus proves particularly appropriate.

The polyurethane resin is the general term for those resins which are obtained by the reaction of hydroxy group-containing resins such as polyester polyols and/or polyether polyols with a polyisocyanate-containing compound. The resin results from the polymerization of such synthetic raw materials as will be more fully described herein below until a number average polymer weight reaches a level in the approximate range of 500 to 200,000. The Q value (weight average molecular weight (Mw)/number average molecular weight (Mn)) of the resin is in the approximate range of 1.5 to 4.

The polyurethane resin appropriately contains at least two species of polyurethane resin having glass transition points, Tg, differing from each other and yet falling in the range, $-20°$ C.$\leq$Tg $\leq 80°$ C., in a combined amount in the range of 10 to 90% by weight, based on the amount of the binder resin. The use of the plurality of species of polyurethane resin has the advantage of manifesting running stability, calender formability, and electromagnetic transducer properties in balanced magnitudes.

The vinyl chloride type copolymer and the urethane resin containing an S- and/or P-containing polar group are advantageously used as combined at a gravimetric ratio in the range of 10:90 to 90:10.

These resins are allowed to contain additionally any of various known resins in an amount of not more than 20% by weight, based on the total amount of the resins.

In the raw materials for the urethane resin, as concrete examples of the hydroxyl group-containing resin, polyalkylene glycols such as polyethylene glycol, polybutylene glycol, and polypropylene glycol, alkylene oxide adducts such as bis-phenol A, various species of glycol, and polyester polyols possessing a hydroxyl group at a terminal of molecular chain may be cited.

As concrete examples of the carboxylic acid component of the polyester polyol, aromatic dicarboxylic acids such as terephthalic acid, isophthalic acid, orthophthalic acid, and 1,5-naphthalic acid, aromatic oxycarboxylic acids such as p-oxybenzoic acid and p-(hydroxyethoxy)benzoic acid, aliphatic dicarboxylic acids such as succinic acid, adipic acid, azelaic acid, sebacic acid, and dodecanedicarboxylic acid, unsaturated fatty acids such as fumaric acid, maleic acid, itaconic acid, tetrahydrophthalic acid, and hexahydrophthalic acid, alicyclic dicarboxylic acids, and tri- and tetra-.carboxylic acids such as trimellitic acid, trimesic acid, and pyromellitic acid may be cited.

As concrete examples of the glycol component of the polyester polyol, ethylene oxide adducts and propylene oxide adducts such as ethylene glycol, propylene glycol, 1,3-propane diol, 1,4-butane diol, 1,5-pentane diol, 1,6-hexane diol, neopentyl glycol, diethylene glycol, dipropylene glycol, 2,2,4-trimethyl-1,3-pentane diol, 1,4-cyclohexane dimethanol, and bis-phenol A, ethylene oxide and propylene oxide adducts of bis-phenol A hydride, polyethylene glycol, polypropylene glycol, and poly-tetra methylene glycol may be cited. These glycol moieties may be used in combination with such tri- and tetra-ols as trimethylol ethane, trimethylol propane, glycerin, and pentaerythritol.

Such lactone type polyester diols as are obtained by subjecting such lactones as caprolactone to ring-opening polymerization may be cited as other examples of the polyester polyol.

As concrete examples of the polyisocyanate which is usable herein, diisocyanate compounds as tolylene diisocyanate, phenylene diisocyanate, diphenyl methane diisocyanate, hexa-methylene diisocyanate, tetramethylene diisocyanate, naphthalene diisocyanate, isophorone diisocyanate, xylylene diisocyanate, diisocyanate trimethyl cyclohexane, diisocyanate cyclohexyl methane, dimethoxy-biphenylene diisocyanate, and diisocyanate diphenyl ether, and triisocyanate compounds such as trimers of 7 mol % and less of tolylene diisocyanate in all the isocyanate groups and trimers of hexamethylene diisocyanate may be cited.

As concrete examples of the polar group which is contained in the resins mentioned above, S-containing groups such as $-SO_3M$ and $-SO_4M$, P-containing polar groups such as $=PO_3M$, $=PO_2M$, $=POM$, $-P=O(OM1)(OM2)$, and $-OP=O(OM1)(OM2)$, $-COOM$, $-NR_4X$ (wherein M, M1, and M2 independently stand for H, Li, Na, K, —NR$_4$, or —NHR$_3$, R stands for an alkyl group or H, and X stands for a halogen atom), —OH, —NR$_2$, —N⁺R$_3$ (wherein R stands for a hydrocarbon group), epoxy group, —SH, and —CN may be cited. At least one polar group selected from the group consisting of the polar groups enumerated above is appropriately incorporated in the resin by means of copolymerization or addition reaction. As the substituent M, Na is used particularly advantageously. The polar group is appropriately contained in the resin in an amount in the range of 0.01 to 10%, preferably 0.02 to 3%, by weight as atoms in the molecule. This polar group may be present in the main chain or in the branch of the skeleton resin.

The urethane resin under discussion is obtained by causing a specific polar group-containing compound and/or a raw material containing a raw material resin resulting from the reaction with a specific polar group-containing compound to react in the presence or absence of a solvent in accordance with the known method.

As concrete examples of the other thermoplastic resin, (meth)acrylic resin, polyester resins, acrylonitrile-butadiene type copolymers, polyamide resin, polyvinyl butyral, nitrocellulose, styrene-butadiene type copolymers, polyvinyl alcohol resin, acetal resin, epoxy type resins, phenoxy type resins, polyether resin, polycaprolactone and other polyfunctional polyethers, polyamide resin, polyimide resin, phenol resin, polybutadiene elastomer, chloride rubber, acryl rubbers, isoprene rubber, and epoxy-modified rubbers may be cited.

As concrete examples of the thermosetting resin, phenol resin, epoxy resin, polyurethane curing type resin, urea resin, butyral resin, formal resin, melamine resin, alkyd resin, silicone resin, acryl type reaction resin, polyamide resin, epoxy-polyamide resin, saturated polyester resins, and urea formaldehyde resin may be cited.

In the copolymers mentioned above, those which possess a hydroxyl group at a terminal or in a side chain are favorably used as reaction type resins because they allow easy use of crosslinkage with an isocyanate or modification by electron beam cross-linkage. The copolymers may contain acidic polar groups and basic polar groups like —COOH, —SO$_3$M, —OSO$_3$M, —OPO$_3$X, —PO$_2$X, —PO$_2$X, —N⁺R$_3$Cl⁻, and —NR$_2$ as polar groups at a terminal or in a side chain. The incorporation of these additional polar groups has the advantage of improving the dispersibility.

These polar groups may be used either single or in the form of a combination of two or more members.

Various polyisocyanates can be used as a hardening agent for hardening a binder resin. A hardening agent obtained by converting at least one member selected from the group consisting of tolylene diisocyanate, hexamethylene diisocyanate, and methylene diisocyanate into trimethylol propane which possesses a plurality of hydroxyl groups or into an isocyanurate type hardening agent having three molecules of diisocyanate compound bound therein is advantageously used. The content of the hardening agent is appropriately in the range of 1 to 50% by weight, based on 100% by weight of the resin. This hardening agent is three-dimensionally bound with the hydroxyl group contained in the binder resin to improve the durability of the coating layer.

The concrete commercially available products include Coronate L, HL, and 3041 marketed by Nippon Polyurethane K.K. 24A-100 and TPI-100 marketed by Asahi Chemical Industry Co., Ltd. and Desmodule L and N marketed by BF Goodrich Corp., for example.

Generally, the reactive or thermosetting resin is hardened by heating the resin in an oven at a temperature in the range of 50° to 80° C. for a period in the range of 6 to 100 hours or by passing the resin at a low speed through the interior of an oven at a temperature in the range of 80° to 120° C.

The copolymer may be modified, prior to use, by the well-known method so as to incorporate therein a (meth) acrylic type double bond and acquire sensitivity to the electron beam.

As means to effect the modification for the impartation of electron beam sensitivity, the method of urethane modification which comprises causing the copolymer to react with an adduct of tolylene diisocyanate (TDI) with 2-hydroxyethyl (meth)acrylate (2-HEMA), the improved method of urethane modification which involves use of a monomer (such as, for example, 2-isocyanate ethyl(meth)acrylate) which contains at least one ethylenically unsaturated double bond and one isocyanate group in the molecule and containing no urethane bond in the molecule, and the method of ester modification which comprises causing a resin possessing a hydroxyl group or a carboxylic acid group to react with a compound possessing a (meth)acryl group and a carboxylic anhydride or a dicarboxylic acid have been well known in the art. Among other methods, the improved method of urethane modification has the particular advantage of allowing an addition to the content of the vinyl chloride type resin without developing brittleness and permitting production of a coating excelling in dispersing property and surface properties.

The content of the electron beam functional group is appropriately in the range of 1 to 40 mol %, preferably 10 to 30 mol %, in the hydroxyl group component from the standpoint of the stability in the process of production and the electron beam curing property. Particularly in the case of a vinyl chloride type copolymer, when the relevant monomers are so used in the reaction as to effect incorporation in the produced copolymer of 1 to 20, preferably 2 to 10, functional groups per molecule, the electron beam-cured resin consequently obtained excels in both dispersing property and hardening property.

The term "acryl type double bond" as used herein refers to a (meth)acryloyl group which is the residue of (meth) acrylic acid, (meth)acrylic esters, and (meth)acrylic acid amides. The electron beam sensitive resin, prior to use, is allowed to incorporate therein 1 to 50% by weight of the well-known polyfunctional acrylate for the purpose of improving the ratio of cross-linkage.

As the source of radiation for the curing of the coating material using the electron beam sensitive modified resin as a binder, an electron beam and/or an ultraviolet light is used advantageously from the viewpoint of facilitating the control of the amount of radiation absorbed, the introduction of the radiation into the line of production process, and the shielding of an operation in process against an ionizing radiation. In the case of the electron beam, it is advantageous to adopt an electron beam accelerator having an acceleration voltage in the range of 100 to 150 kV, preferably 150 to 300 kV and operate this electron beam accelerator so that the amount of radiation to be absorbed is in the range of about 20 to 200 k-gray.

In the case of the electron beam cross-linkage, it is important that the electron beam be irradiated in an ambience of such an inert gas as N$_2$, He, or CO$_2$ having an oxygen content of 1% and less. This condition is intended to prevent the O$_3$ produced in consequence of the irradiation from sequestering a radical.

When the ultraviolet light is used, the binder containing the electron beam curing resin incorporates therein a well-known photopolymerization sensitizer. It can be effectively irradiated by the use of such an ultraviolet light tube as a xenon discharge tube or a hydrogen discharge tube.

The solvent to be contained in the magnetic coating material for the formation of the magnetic layer 30 has no particular limit. It is properly selected in due respect of such factors as the solubility and compatibility of the binder resin, and drying efficiency of the binder. As concrete examples of the solvent, ketones such as methylethyl ketone, methylisobutyl ketone, and cyclohexanone, aromatic hydrocarbons such as toluene and xylene, esters such as ethyl acetate and butyl acetate, alcohols such as isopropanol and butanol, chlorine-substituted hydrocarbons, dioxane, tetrahydrofuran, dimethyl formamide, and hexane, and other similar diluents and solvents may be cited. These solvents can be used either singly or in the form of a mixture of two or more members.

The organic solvent is not always required to have an assay of 100%. It may contain such impurities as isomers, unaltered reactants, by-products, decomposed substances, oxides, and moisture. The total content of these impurities must be 5% and less, preferably 3% and less, by weight. If the content of impurities is unduly large, the excess impurities will exert adverse effects on the dispersibility of the magnetic powder, the storageability of the coating material, the hardening properties of the magnetic layer, and the storage properties of the medium.

The solvent is appropriately used in an amount in the range of 10 to 10,000%, preferably 100 to 5,000%, by weight based on the total amount of the binder so that the viscosity of the produced coating material determined at the stage of application to a substrate by the use of a corn plate type or a double-cylinder type viscosimeter at a shear rate of 3,000 $sec^{-1}$ falls in the range of 5 to 100 cps. The ratio of the amount of the solvent to the whole amount of the coating material is appropriately in the approximate range of preferably 10 to 35%, by weight as solids (nonvolatile substances) concentration. The kind, the mixing ratio, and the amount of this solvent to be used ought to be determined in due consideration of the kind, specific surface area, particle size, amount of magnetization, volume or weight degree of filling of the pigment used in the coating material, and the dilution stability of the coating material so that the viscosity of the coating material fails in the range mentioned above.

The addition of the solvent is advantageously carried out stepwise along the component steps of the process of production of the coating material. Otherwise, it may be sequentially added as stirred at a fixed flow volume into the tank or it may be gradually mixed with the coating material in the pipe leading to the site of application to a substrate. When the solvent is added to the coating material or when the coating material is diluted with the solvent, the coating material is appropriately subjected to a treatment of filtration and/ or dispersion when permissible. This treatment is effective in stabilizing the coating material and repressing the occurrence of agglomeration and foreign matter.

The magnetic coating material for the formation of the magnetic layer 30 generally contains a lubricant. In the various known lubricants, a fatty acid and/or a fatty ester is used particularly advantageously. As concrete examples of the fatty acid, monobasic fatty acids of 12 to 24 carbon atoms (which may contain an unsaturated bond or a branch) may be cited. As concrete examples of the fatty ester, monofatty esters, difatty esters, and trifatty esters formed to react monobasic fatty acids of 10 to 24 carbon atoms (which may contain an unsaturated bond or a branch) with one of alcohols such as cyclic or polysaccharide reduced alcohols (such as sorbitans and sorbitols), monovalent, divalent, trivalent, tetravalent, pentavalent, and hexavalent alcohols having 2 to 22 carbon atoms (which may contain an unsaturated bond or a branch) may be cited. These lubricants may be used either singly or in the form of a mixture of two or more members.

As concrete examples of the monobasic fatty acid, lauric acid, myristic acid, stearic acid, oleic acid, linolic acid, linolenic acid, behenic acid, erucic acid, and elaidic acid may be cited. As concrete examples of the fatty ester, butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate may be cited. The lubricant may be incorporated in the undercoating layer 20.

The effect of such a fatty acid and/or a fatty ester as a lubricant or dispersant is manifested by having the acid and/or ester incorporated in the magnetic coating material in a total amount of 0.1% and over by weight based on the amount of the fine ferromagnetic powder. The conspicuity of this effect grows in proportion as the total content of this acid and/or ester increases. If this total content is more than 20% by weight based on the amount of the fine ferromagnetic powder, the excess lubricant or dispersant will not remain fast within the magnetic layer but exude to the surface of the magnetic layer possibly to the extent of exerting adverse effects of smearing the magnetic head and lowering the output of the recording medium.

The total content of the fatty acid and/or fatty ester in the magnetic layer, therefore, is appropriately in the range of 0.1 to 20%, preferably 1 to 15%, more preferably 1 to 12%, by weight based on the amount of the fine ferromagnetic powder.

Further, when the magnetic recording medium has a backcoat layer, the lubricant may be incorporated more in the backcoat layer side of the recording medium with the hope of enhancing the lubricity of the surface of the magnetic layer owing to the transfer of the lubricant from the backcoat layer to the magnetic layer.

The fatty acid and/or the fatty ester need not always have an assay of 100% but may contain such impurities as isomers, unaltered reactants, by-products, decomposed substances, and oxides. The total content of these impurities is appropriately 40% and less, preferably 20% and less.

The additives including the fatty acid and the fatty ester to be used herein may be wholly or partly added to the coating material in process at any of the component steps of the process for the manufacture of the magnetic recording medium. This addition is implemented, for example, by the additives being mixed with the pigment powder prior to the step of kneading, added during the step of kneading of the pigment powder and the binder with the aid of a solvent, added at the step of dispersion, added subsequent to the step of dispersion, added immediately before the step of application to a substrate, or a solution on dispersion of additives coated on a magnetic layer formed in advance.

The magnetic coating material for the formation of the magnetic layer 30 generally incorporates therein additives capable of manifesting a lubricating effect, an antioxidant effect, a dispersing effect, a plasticizing effect, etc. As concrete examples of the additives, silicone oils, fluorine oil, fluorine-substituted hydrocarbon-containing alcohols, fatty acids, esters, and ethers, paraffins, metal (Li, Na, K, Ca, Ba, Cu, Pb, etc.) salts of such monobasic fatty acids as mentioned above, alcohols for the production of such fatty esters as mentioned above, alkoxy alcohols, fatty esters of polyethylene oxide-added monoalkyl ethers, aliphatic or cyclic amines, fatty acid amides, quaternary ammonium salts, polyolefins, polyglycols, polyphenyl ethers, fluorine-containing alkyl sulfuric esters and alkali metal salts thereof, alkylene oxide type, glycerin type, glycidol type, and alkylphenol ethylene oxide-added type nonionic surfactants, cationic surfactants such as phosphonium and sulfonium and alkali metal salts thereof, anionic surfactants containing such acidic groups as carboxylic acid group, sulfonic acid group, phosphoric acid group, sulfuric ester group, and phosphoric ester group and alkali metal salts thereof, and amphoteric surfactants such as amino acids, aminosulfonic acids, sulfuric or phosphoric esters of amino alcohols, and alkyl betaines may be cited.

These surfactants are described in detail in the "Surfactant Handbook" (published by Sangyo Tosho K.K.).

The amount of such a surfactant to be incorporated in the magnetic coating material is appropriately 10% and less, preferably in the range of 0.01 to 5%, by weight based on the amount of the magnetic powder. In the absence of the magnetic powder, this amount is properly in the range of 0.005 to 50% by weight based on the amount of the binder.

The magnetic coating material for the formation of the magnetic layer 30 may further incorporate therein carbon black. As concrete examples of the carbon black to be used herein, furnace carbon black, thermal carbon black, and acetylene black may be cited. The particle size and other similar factors of the carbon black may be arbitrarily set. To be specific, they may be properly selected to consider the balance of magnitudes of the electric resistance, friction properties, and the output at the shortest recording wavelength (surface roughness). The species of carbon black mentioned above may be used either singly or in the form of a mixture of two or more members. The aforementioned factors may be selected independently for the species of carbon black to be selected. The average particle diameter of the carbon black is properly in the range of 10 to 400 nm, preferably 20 to 350 nm. More specifically, in the range of 20 to 40 nm when the electromagnetic transducer properties are taken into account preferentially. In case of considering the friction, the largest possible particle diameter allowable for the sake of the electromagnetic transducer properties may be selected in the range of 40 to 350 nm. In the selection of carbon black, not only the particle size but also the BET value and the DBP value (dibutyl phtharate adsorption value) must be taken into account. Since the particle size, BET value, and DBP value of carbon black are so closely related to one another as to render it infeasible to set these factors at independent and mutually remote magnitudes, the three factors must be empirically selected based on the properties expected of the recording medium and the dispersion properties and the flow properties of the coating material.

The carbon black is used in an amount in the range of 10 to 500% by weight based on the amount of the binder or in the range of 0.1 to 20% by weight based on the amount of the ferromagnetic powder. These gravimetric ratios of the amount of carbon black must be empirically selected based on the properties expected of the recording medium and the dispersion properties and flow properties of the coating material. The species of carbon black are used as properly combined to suit the properties expected of the magnetic layer, the backcoat layer, and the undercoating layer. The carbon black may be added at the time that it is kneaded with or dispersed in the magnetic powder. Otherwise, it may be dispersed in advance in the binder and then added at the time that it is dispersed in the magnetic coating material.

The carbon black may be subjected to a surface treatment using a lubricant or a dispersant. Otherwise, it may have part of the surface of its particles graphitized prior to use. For information on the carbon black which can be used in this invention, the "Carbon Black Nenkan" compiled by Carbon Black Society can be consulted.

The magnetic coating material for the formation of the magnetic layer 30 may further incorporate therein a non-ferromagnetic organic powder. As concrete examples of the n en-ferromagnetic organic powder to be used herein, acryl-styrene type resin powder, benzoguanamine resin powder, melamine type resin powder, phthalocyanine type pigment, azo type pigment, polyolefin type resin powder, polyester type resin powder, polyamide type resin powder, polyimide type resin powder, hydrocarbon fluoride resin powder, and divinyl benzene type resin powder may be cited. This non-ferromagnetic organic powder is used in an amount in the range of 0.1 to 20% by weight, based on the amount of the binder.

For the deposition of the magnetic coating material on the substrate, a method of extrusion nozzle coating, a method of reverse roll coating, a method of gravure roll coating, a method of knife-coater coating, a method of doctor blade coating, a method of kiss coating, a method of collar coating, and a method of slide bead coating can be utilized. Among the methods mentioned above, the method of gravure roll coating is excellent in productivity and the method of reverse roll coating has the advantage of being adaptable for a wide range of coating materials. The method of extrusion nozzle coating is excellent in facilitating control of the thickness of the applied layer. On the other hand, for the deposition of the undercoating layer 20, the foregoing methods are also used.

The magnetic coating material which has been deposited on the substrate by such a method as described above (to form a so-called magnetic layer), is subjected to a treatment for the orientation of a magnetic field, a drying treatment, or a surface smoothing treatment. As the surface smoothing treatment for the magnetic layer, the calendering treatment is used. The calendering treatment may use rolls in combination (3 to 7 stage combination) of heat-resisting plastic rolls made of epoxides, polyesters, nylons, polyamides, polyimides, polyamideimides or the like (which may be mixed with inorganic compound like carbon and metal) and metal rolls, or in combination of metal rolls. A treatment temperature is set preferably no less than 70° C., and more preferably no less than 80° C., a linear pressure is set to preferably 200 kg/cm, and more preferably 300 kg/cm, and a treatment speed is set in the range of 20 to 700 m/min. Then, the laminate consequently obtained is cut into strips of a prescribed shape, for example, to achieve the magnetic recording media.

In this preferred embodiment, if necessary, between the substrate 10 and the undercoating layer 20 may be interposed an intermediate layer in which a particle size and an adding amount of the nonmagnetic particles are controlled, or a resin layer having a low glass-transition temperature (Tg). With this arrangement, it is possible to expect improvement in uniformity of the surface roughness or in effectiveness of the calendering treatment.

Further, the magnetic recording medium 1 may have one of various known backcoat layers on a reverse side of the substrate 10 (the side not covered by the magnetic layer).

Now, the present invention will be described in further detail with reference to specific examples of the invention.

EXAMPLE 1)

A magnetic coating material for the formation of the magnetic layer 30 and a coating material for the formation of the undercoating layer 20 were prepared, respectively, as identified below.

First, the magnetic coating material for the formation of the magnetic layer was prepared with the following composition including magnetic powder of ferromagnetic metal [Fe/Co/Al/Y=100/20/4.2/5.3 (gravimetric ratio)] having Hc=2,000 Oe, σs=135 emu/g, a specific surface area as determined by the BET method (hereinafter referred to as "BET value") being 55 m$^2$/g, an average length of major axis 0.08 μm and an average ratio of axes 5.

Composition of Magnetic Coating Material for Formation of Magnetic Layer

Magnetic powder of ferromagnetic metal—100 parts by weight
Vinyl chloride type copolymer having a polymerization degree of 300 and containing a polar group —SO$_3$K (produced by Nippon Zeon K.K. and marketed under product code of "MR-110")—8 parts by weight
Polyurethane resin (produced by Toyobo Co., Ltd. and marketed under product code of "UR8700")—8 parts by weight
α-Al$_2$O$_3$ having an average particle size of 0.20 μm (produced by Sumitomo Chemical Co., Ltd. and marketed under product code of "HIT60A")—3 parts by weight
Stearic acid—1 part by weight
Butyl stearate—1 part by weight
Methylethyl ketone—140 parts by weight
Toluene—140 parts by weight
Cyclohexanone—90 parts by weight This composition was given a thorough kneading treatment in a kneader and then dispersed by means of a sand grinder mill. The magnetic coating material thus obtained and 3 parts by weight of a hardening agent (produced by Nippon Polyurethane Kogyo K.K. and marketed under trademark designation of "Coronate L") added thereto were mixed so as to prepare the coating material for the formation of the magnetic layer 30.

Subsequently, the coating material for the formation of the undercoating layer 20 was prepared with the following composition.

Composition of Coating Material for Formation of Undercoating Layer

α-Fe$_2$O$_3$ having an average major axis length of 0.15 μm, an axis ratio of 6.5 and a BET value of 53 m$^2$/g (produced by Toda Kogyo K.K. and marketed under product code of "DPN250BX)—100 parts by weight
Vinyl chloride type copolymer having a polymerization degree of 300 and containing a polar group—SO$_3$K (produced by Nippon Zeon K.K. and marketed under product code of "MR-110")—10 parts by weight
Polyurethane resin (produced by Toyobo Co., Ltd. and marketed under product code of "UR8700")—10 parts by weight
Stearic acid—1 part by weight
Butyl stearate—1 part by weight
Methylethyl ketone—80 parts by weight
Toluene—80 parts by weight
Cyclohexanone—80 parts by weight This composition was given a thorough kneading treatment in a kneader and then dispersed by means of a sand grinder mill. The coating material thus obtained and 4 parts by weight of a hardening agent (produced by Nippon Polyurethane Kogyo K.K. and marketed under trademark designation of "Coronate L") added thereto were mixed so as to prepare the coating material for the formation of the undercoating layer 20.

Using these coating materials, various samples of magnetic recording tapes were prepared in the following manner. First, the coating material for the formation of the undercoating layer 20 was deposited on the nonmagnetic substrate 10 having 10 μm in thickness and made of polyethylene terephthalate (PET), and then dried. Subsequently, the dried undercoating layer was subjected to a calendering treatment under the conditions of a temperature of 100° C., a linear pressure of 300 kg/cm and 3 nips, and then left standing at ordinary temperature for three days. A thickness of the undercoating layer 20 when dried was 1.5 μm. The foregoing magnetic coating material was deposited on this undercoating layer 20, subjected to an orienting treatment in a magnetic field of 7,000 G (gauss), and then dried. Thereafter, the dried magnetic layer was subjected to a calendering treatment under the conditions of a temperature of 100° C., a linear pressure of 300 kg/cm and 3 nips, and then subjected to a thermosetting treatment at 60° C. for 24 hours. A thickness of the magnetic layer 30 when dried was 0.2 μm. Thereafter, the resultant material was cut into strips of 8 mm in width to produce tape samples of magnetic recording medium (Example 1 Sample).

(EXAMPLES 2 AND 3)

The content of the abrasive contained in the magnetic layer in Example 1 (relative to 100 parts by weight of the ferromagnetic powder) was changed from 3 parts by weight to 1 part by weight (Example 2) and 5 parts by weight (Example 3), respectively. Except for this, samples of Examples 2 and 3 were prepared in the same manner as in Example 1.

(EXAMPLES 4 AND 5)

The thickness of the magnetic layer in Example 1 was changed from 0.20 μm to 0.10 μm (Example 4) and 0.30 μm (Example 5), respectively. Except for this, samples of Examples 4 and 5 were prepared in the same manner as in Example 1.

(EXAMPLES 6 AND 7)

The average particle size of the abrasive contained in the magnetic layer in Example 1 was changed from 0.20 μm to 0.10 μm (Example 6) and 0.40 μm (Example 7), respectively. Except for this, samples of Examples 6 and 7 were prepared in the same manner as in Example 1.

(EXAMPLES 8 AND 9)

The kind of the abrasive contained in the magnetic layer in Example 1 was changed from Al$_2$O$_3$ to Cr$_2$O$_3$ (Example 8) and SiC (Example 9), respectively, while average particle sizes thereof remain to be 0.20 μm, respectively. Except for this, samples of Examples 8 and 9 were prepared in the same manner as in Example 1.

(EXAMPLES 10–12)

In Example 1, the undercoating layer was subjected to the calendering treatment after drying. In Example 10, the undercoating layer was further subjected to a thermosetting treatment at 60° C. for 24 hours. In Example 11, the undercoating layer was only dried, but not subjected to the calendering treatment. In Example 12, the undercoating layer was not subjected to the calendering treatment, but subjected to a thermosetting treatment at 60° C. for 24 hours after drying. Except for this, samples of Examples 10–12 were prepared in the same manner as in Example 1.

(EXAMPLES 13 AND 14)

The content of the nonmagnetic particles ($\alpha$-$Fe_2O_3$) contained in the undercoating layer in Example 1 (relative to the whole undercoating layer) was changed from 79% by weight to 40% by weight (Example 13) and 85% by weight (Example 14), respectively. Except for this, samples of Examples 13 and 14 were prepared in the same manner as in Example 1.

(EXAMPLES 15 AND 16)

The average particle size of the nonmagnetic particles ($\alpha$-$Fe_2O_3$) contained in the undercoating layer in Example 1 was changed from 0.15 μm to 0.20 μm (Example 15) and 0.03 μm (Example 16), respectively. Following this, the axis ratio is also changed to 6 (Example 15) and 1 (Example 16), respectively. Except for this, samples of Examples 15 and 16 were prepared in the same manner as in Example 1.

(EXAMPLE 17)

The kind of the nonmagnetic particles contained in the undercoating layer in Example 1 was changed from $\alpha$-$Fe_2O_3$ to carbon black (average particle size=0.03 μm; axis ratio= 1), and the content thereof was also changed to 60% by weight. Except for this, sample of Example 17 was prepared in the same manner as in Example 1.

(EXAMPLES 18 AND 19)

The thickness of the undercoating layer in Example 1 was changed from 1.50 μm to 0.50 μm (Example 18) and 2.00 μm (Example 19), respectively. Except for this, samples of Examples 18 and 19 were prepared in the same manner as in Example 1.

(Comparative Examples 1 and 2)

The content of the abrasive contained in the magnetic layer in Example 1 (relative to 100 parts by weight of the ferromagnetic power) was changed from 3 parts by weight to 0.5 part by weight (Comparative Example 1) and 6 parts by weight (Comparative Example 2), respectively. Except for this, samples of Comparative Examples 1 and 2 were prepared in the same manner as in Example 1.

(Comparative Examples 3 AND 4)

The thickness of the magnetic layer in Example 1 was changed from 0.20 μm to 0.08 μm (Comparative Example 3) and 0.40 μm (Comparative Example 4), respectively. Except for this, samples of Comparative Examples 3 and 4 were prepared in the same manner as in Example 1.

(Comparative Example 5)

The average particle size of the abrasive contained in the magnetic layer in Example 1 was changed from 0.20 μm to 0.50 μm (Comparative Example 5). Except for this, sample of Comparative Example 5 was prepared in the same manner as in Example 1.

(Comparative Examples 6 AND 7)

The content of the nonmagnetic particles ($\alpha$-$Fe_2O_3$) contained in the undercoating layer in Example 1 (relative to the whole undercoating layer) was changed from 79% by weight to 33% by weight (Comparative Example 6) and 90% by weight (Comparative Example 7), respectively. Except for this, samples of Comparative Examples 6 and 7 were prepared in the same manner as in Example 1.

(Comparative Example 8)

The thickness of the undercoating layer in Example 1 was changed from 1.50 μm to 0.30 μm. Except for this, sample of Comparative Example 8 was prepared in the same manner as in Example 1.

(Comparative Example 9)

The average particle size of the nonmagnetic particles ($\alpha$-$Fe_2O_3$) contained in the undercoating layer in Example 1 was changed from 0.15 μm to 0.25 μm(axis ratio=6). Except for this, sample of Comparative Example 9 was prepared in the same manner as in Example 1.

(Comparative Example 10)

The formation of the undercoating layer and the magnetic layer in Example 1 was changed to the so-called wet-on-wet method, wherein the magnetic layer was coated on the undercoating layer while the latter was still in a wet state. Except for this, sample of Comparative Example 10 was prepared in the same manner as in Example 1.

(Comparative Example 11)

The undercoating layer in Example 1 was not provided. Except for this, sample of Comparative Example 11 was prepared in the same manner as in Example 1.

(Comparative Example 12)

The undercoating layer in Example 1 was not provided, while the thickness of the magnetic layer was increased to 0.4 μm correspondingly. Except for this, sample of Comparative Example 12 was prepared in the same manner as in Example 1.

In the foregoing manner, various samples (Examples 1–19, Comparative Examples 1–12) were prepared as shown in Table 1. They were tested for surface roughness (Ra), RF-output, C/N ratio, friction coefficient, still life and head abrasion as shown below.

Surface Roughness (Ra)

This property was tested by the use of a surface roughness testing device (produced by Rank-Tayler-Hobson Corporation and marketed under trademark designation of "Tallistep") at 50,000 magnifications and a measuring wavelength, $\lambda$, of 3.3 to 167 μm in accordance with JIS (Japanese Industrial Standard) B 0601 (1982). The measuring sample length was 0.5 mm. This property was an average of 5 samples and the unit was reduced to nm.

RF-Output (7 MHz)(dB)

This property was determined by measuring the play-back output of a recording signal of a wavelength of 7 MHz by means of a Hi-8 deck (produced by Sony Corporation and marketed under product code of "EV-S900"). The play-back output achieved in Comparative Example 12 was used as a reference (0 dB).

C/N Ratio (7 MHz) (dB)

This property was determined by recording and replaying the single wave of 7 MHz by means of a Hi-8 deck (produced by Sony Corporation and marketed under product code of "E V-S900") and monitoring the replayed signal by means of a video noise meter. The C/N ratio achieved in Comparative Example 12 was used as a reference (0 dB).

Friction Coefficient

By running the sample on a stainless pin having a diameter of 4 mm, at an angle of 180° relative to the pin, under a tension of 20 g and at a speed of 1 m/min, the friction coefficient was derived from the tension ratio before and after the pin using the Euler's equation.

Still Life (min)

This property was determined by loading the tape sample in a Hi-8 deck (produced by Sony Corporation and marketed under product code of "EV-S900"), keeping the still mode and measuring a time until the so-called RF-output dropped −16 dB.

Head Abrasion (μm/200 hr)

This property was determined by replaying and rewinding the tape sample having a length of 60 m for 200 hours by means of a Hi-8 deck (produced by Sony Corporation and marketed under product code of "EV-S35"), and measuring a difference between an initial projecting length of a magnetic head and a projecting length thereof after the running of the tape sample.

The results are shown in Table 1 below.

TABLE 1

| | Undercoating layer | | | Magnetic layer | | | Tape property | | | | | |
|---|---|---|---|---|---|---|---|---|---|---|---|---|
| | | Nonmagnetic particle | | | Abrasive | | | | | | | |
| | Undercoating layer treatment | Thickness (μm) | Particle size (nm) | Content (wt %) | Thickness (μm) | Particle size (μm) | Content (wt %) | Ra (nm) | RF-output (dB) | C/N (dB) | Friction coefficient | Still life (min) | Head abrasion (μm) |
| Ex. 1 | D + Ca | 1.50 | 0.15 | 79 | 0.20 | 0.20 | 3.0 | 3.2 | +2.0 | +2.8 | 0.25 | 120↑ | 1.0 |
| Ex. 2 | D + Ca | 1.50 | 0.15 | 79 | 0.20 | 0.20 | 1.0 | 3.1 | +2.2 | +3.3 | 0.27 | 45 | 0.5 |
| Ex. 3 | D + Ca | 1.50 | 0.15 | 79 | 0.20 | 0.20 | 5.0 | 3.4 | +1.5 | +2.0 | 0.24 | 120↑ | 2.0 |
| Ex. 4 | D + Ca | 1.50 | 0.15 | 79 | 0.10 | 0.20 | 3.0 | 3.5 | +1.5 | +1.5 | 0.24 | 90 | 1.5 |
| Ex. 5 | D + Ca | 1.50 | 0.15 | 79 | 0.30 | 0.20 | 3.0 | 3.1 | +1.8 | +2.6 | 0.26 | 75 | 1.0 |
| Ex. 6 | D + Ca | 1.50 | 0.15 | 79 | 0.20 | 0.10 | 3.0 | 3.0 | +2.2 | +3.0 | 0.27 | 85 | 0.5 |
| Ex. 7 | D + Ca | 1.50 | 0.15 | 79 | 0.20 | 0.40 | 3.0 | 3.7 | +1.4 | +1.8 | 0.25 | 120↑ | 1.5 |
| Ex. 8 | D + Ca | 1.50 | 0.15 | 79 | 0.20 | 0.20 | 3.0 | 3.2 | +1.8 | +2.6 | 0.24 | 120↑ | 1.0 |
| Ex. 9 | D + Ca | 1.50 | 0.15 | 79 | 0.20 | 0.20 | 3.0 | 3.3 | +1.7 | +2.4 | 0.24 | 120↑ | 1.5 |
| Ex. 10 | D + Ca + H | 1.50 | 0.15 | 79 | 0.20 | 0.20 | 3.0 | 3.1 | +2.0 | +2.8 | 0.25 | 120↑ | 1.0 |
| Ex. 11 | D | 1.50 | 0.15 | 79 | 0.20 | 0.20 | 3.0 | 3.1 | +2.0 | +2.8 | 0.27 | 70 | 1.0 |
| Ex. 12 | D + H | 1.50 | 0.15 | 79 | 0.20 | 0.20 | 3.0 | 3.6 | +1.3 | +1.8 | 0.24 | 120↑ | 1.5 |
| Ex. 13 | D + Ca | 1.50 | 0.15 | 40 | 0.20 | 0.20 | 3.0 | 3.0 | +1.8 | +2.0 | 0.29 | 48 | 0.5 |
| Ex. 14 | D + Ca | 1.50 | 0.15 | 85 | 0.20 | 0.20 | 3.0 | 3.4 | +1.8 | +2.5 | 0.24 | 120↑ | 1.5 |
| Ex. 15 | D + Ca | 1.50 | 0.20 | 79 | 0.20 | 0.20 | 3.0 | 4.1 | +1.0 | +1.8 | 0.23 | 120↑ | 1.5 |
| Ex. 16 | D + Ca | 1.50 | 0.03 | 79 | 0.20 | 0.20 | 3.0 | 3.1 | +2.1 | +3.0 | 0.26 | 115 | 1.0 |
| Ex. 17 | D + Ca | 1.50 | 0.03 | 60 | 0.20 | 0.20 | 3.0 | 3.1 | +2.2 | +3.1 | 0.28 | 100 | 1.0 |
| Ex. 18 | D + Ca | 0.50 | 0.15 | 79 | 0.20 | 0.20 | 3.0 | 3.8 | +1.5 | +1.9 | 0.24 | 120↑ | 1.5 |
| Ex. 19 | D + Ca | 2.00 | 0.15 | 79 | 0.20 | 0.20 | 3.0 | 3.0 | +2.3 | +3.3 | 0.27 | 110 | 1.0 |
| Comp. Ex. 1 | D + Ca | 1.50 | 0.15 | 79 | 0.20 | 0.20 | 0.5 | 3.1 | +2.2 | +3.2 | 0.26 | 20 | 0.5 |
| Comp. Ex. 2 | D + Ca | 1.50 | 0.15 | 79 | 0.20 | 0.20 | 6.0 | 3.9 | +1.0. | +1.1 | 0.24 | 120↑ | 3.0 |
| Comp. Ex. 3 | D + Ca | 1.50 | 0.15 | 79 | 0.08 | 0.20 | 3.0 | 4.0 | −2.4 | −2.7 | 0.22 | 38 | 2.0 |
| Comp. Ex. 4 | D + Ca | 1.50 | 0.15 | 79 | 0.40 | 0.20 | 3.0 | 3.1 | +1.2 | +1.4 | 0.29 | 35 | 0.5 |
| Comp. Ex. 5 | D + Ca | 1.50 | 0.15 | 79 | 0.20 | 0.50 | 3.0 | 3.8 | +1.4 | +1.8 | 0.2 3 | 120↑ | 3.0 |
| Comp. Ex. 6 | D + Ca | 1.50 | 0.15 | 33 | 0.20 | 0.20 | 3.0 | 3.6 | +1.5 | +1.9 | 0.32 | 35 | 0.5 |
| Comp. Ex. 7 | D + Ca | 1.50 | 0.15 | 90 | 0.20 | 0.20 | 3.0 | 7.1 | −4.6 | −5.0 | 0.23 | 20 | 3.0 |
| Comp. Ex. 8 | D + Ca | 0.30 | 0.15 | 79 | 0.20 | 0.20 | 3.0 | 4.2 | +0.9 | +1.6 | 0.23 | 120↑ | 2.0 |
| Comp. Ex. 9 | D + Ca | 1.50 | 0.25 | 79 | 0.20 | 0.20 | 3.0 | 4.2 | +0.8 | +1.8 | 0.23 | 120↑ | 2.0 |
| Comp. Ex. 10 | W | 1.50 | 0.15 | 79 | 0.20 | 0.20 | 3.0 | 3.1 | +2.0 | +2.8 | 0.32 | 54 | 1.0 |
| Comp. Ex. 11 | — | — | — | — | 0.20 | 0.20 | 3.0 | 5.0 | −1.2 | −1.5 | 0.23 | 5 | 4.0 |
| Comp. Ex. 12 | — | — | — | — | 0.40 | 0.20 | 3.0 | 3.9 | 0 | 0 | 0.36 | 65 | 2.0 |

*In undercoating layer treatment, "D" represents "drying treatment", "Ca" represents "calendering treatment", "H" represents "hardening treatment", "W" represents "wet state".
*In still life, "↑" represents "equal to or greater".
*"Particle size" represents "average particle size".

In Table 1, the optimum magnetic recording medium satisfies all of the following conditions:

7 MHz output ≧+1.0 dB, C/N ≧+1.0 dB, still life ≧40 min, head abrasion ≦2 μm/200 hr and friction coefficient ≦0.30.

It is to be understood that this invention is not to be limited to the preferred embodiment and modifications described above, and that various changes and modifications may be made without departing from the spirit and scope of the invention as defined in the appended claims.

What is claimed is:

1. A magnetic recording medium comprising:

a flexible substrate;

an undercoating layer formed on said substrate; and a single magnetic layer formed on said undercoating layer, wherein said undercoating layer contains a binder and nonmagnetic particles having an average particle size in the range of 0.01 to 0.20 μm, said undercoating layer containing therein said nonmagnetic particles in the range of 40 to 85% by weight, and wherein said magnetic layer contains ferromagnetic powder, a binder and an abrasive having an average particle size in the range of 0.10 to 0.40 μm, said magnetic layer having a thickness in the range of 0.10 to 0.30 μm and containing said abrasive in the range of 1 to 5 parts by weight relative to 100 parts by weight of said ferromagnetic powder, and wherein said magnetic layer is applied on said undercoating layer, after said undercoating layer has been applied on said substrate and dried.

2. The magnetic recording medium according to claim 1, wherein a thickness of said undercoating layer is in the range of 0.5 to 2.0 μm.

3. The magnetic recording medium according to claim 1, wherein said undercoating layer is applied on said substrate, dried and then subjected to a calendering treatment.

4. The magnetic recording medium according to claim 1, wherein said undercoating layer is applied on said substrate, dried and then subjected to a hardening treatment.

5. The magnetic recording medium according to claim 1, wherein said undercoating layer is applied on said substrate, dried, then subjected to a calendering treatment and further subjected to a hardening treatment.

* * * * *